United States Patent
Ohashi et al.

[15] 3,661,723
[45] May 9, 1972

[54] PROCESS FOR RECOVERING OF ACRYLONITRILE AND HYDROCYANIC ACID BY ADDITION OF ACETONITRILE TO THE AQUEOUS ACID NEUTRALIZED EFFLUENT

[72] Inventors: Kiyoshi Ohashi, Hiroshima; Morihiko Ohkuni; Otoharu Kurayoshi, both of Yamaguchi, all of Japan

[73] Assignee: The Standard Oil Company, Cleveland, Ohio

[22] Filed: May 15, 1970

[21] Appl. No.: 37,520

[30] Foreign Application Priority Data

May 26, 1969 Japan..................................44/40239

[52] U.S. Cl....................................203/8, 203/34, 203/35, 203/60, 260/465.3, 260/465.9
[51] Int. Cl....................................B01d 3/34, C07c 121/32
[58] Field of Search..........................203/34, 35, 60, 6, 8, 38; 260/465.3, 465.9

[56] References Cited

UNITED STATES PATENTS

| R26,401 | 6/1968 | Stevens et al. | 203/35 |
| 3,050,546 | 8/1962 | Milberger | 260/465.3 |
| 3,201,918 | 8/1965 | Sennewald et al. | 260/465.3 |
| 3,257,445 | 6/1966 | Roelen et al. | 260/465.3 |
| 3,328,266 | 6/1967 | Modiano et al. | 203/34 |
| 3,372,986 | 3/1968 | Sennewald et al. | 260/465.3 |
| 3,444,234 | 5/1969 | Callahan et al. | 260/465.3 |

*Primary Examiner*—Wilbur L. Bascomb, Jr.
*Attorney*—John F. Jones and Sherman J. Kemmer

[57] ABSTRACT

An improved process for the recovery of acrylonitrile, hydrocyanic acid, and acetonitrile from an aqueous solution of these nitriles wherein the aqueous solution is obtained by contacting the product mixture from a catalytic vapor phase reaction of propylene, ammonia, and air, with an acidic solution in an ammonia neutralization column to remove unreacted ammonia therefrom, where the improvement comprises adding additional acetonitrile to the effluent from the ammonia neutralizing column and distilling the aqueous effluent to recover the nitriles from solution.

1 Claim, 1 Drawing Figure

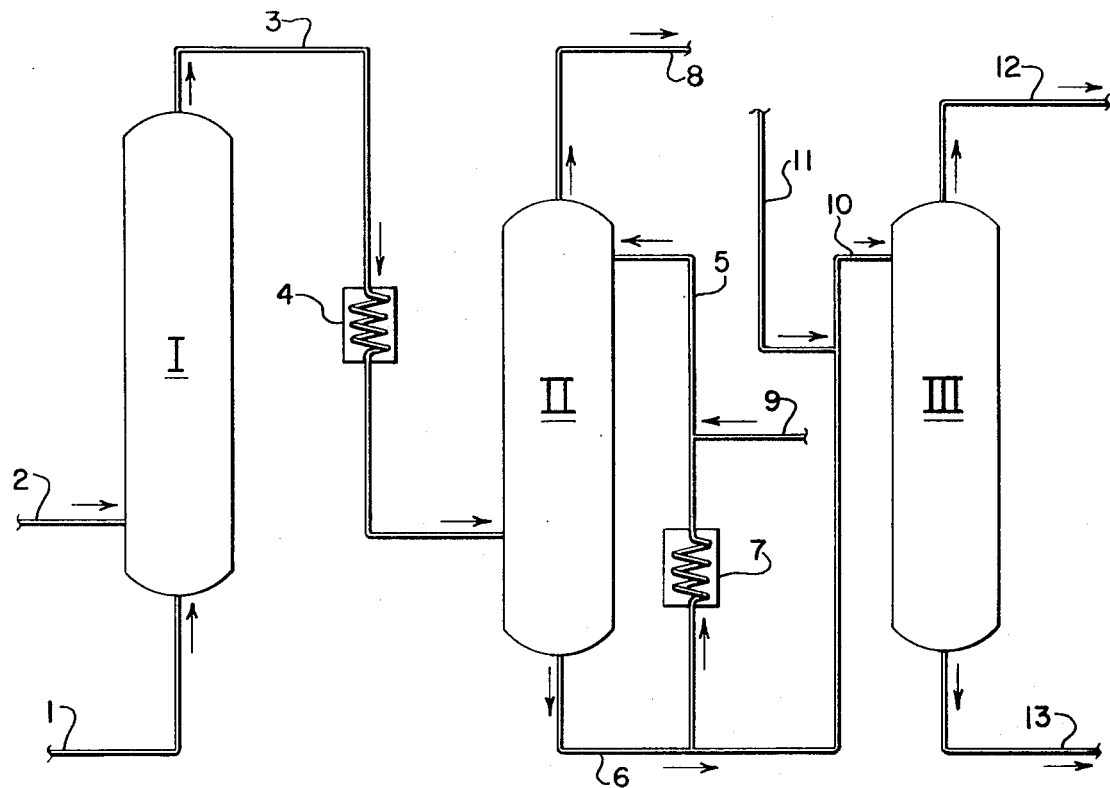

PROCESS FOR RECOVERING OF ACRYLONITRILE AND HYDROCYANIC ACID BY ADDITION OF ACETONITRILE TO THE AQUEOUS ACID NEUTRALIZED EFFLUENT

PROCESS FOR RECOVERING ACRYLONITRILE AND HYDROCYANIC ACID

This invention relates to a process for the efficient recovery of acrylonitrile and hydrocyanic acid from an aqueous solution containing these nitriles. More specifically, this invention relates to an improved process for the recovery of acrylonitrile and hydrocyanic acid by distillation from an acidic solution containing these nitriles. The acidic solution of the nitriles in this invention is obtained by contacting the product mixture from a vapor phase catalytic reaction of propylene, ammonia, and oxygen with a dilute aqueous solution of an acid in an ammonia neutralization column in order to remove unreacted ammonia from the nitrile product.

On contacting the product mixture containing acrylonitrile, unreacted ammonia, and by-products hydrocyanic acid and acetonitrile, with the aqueous acidic solution in the ammonia neutralization column, considerable amounts of acrylonitrile, hydrocyanic acid and acetonitrile, in addition to ammonia, are extracted into the aqueous phase. To discard this aqueous extract containing these nitriles is economically unsound and poses a problem of contamination, and it is therefore highly desirable to recover these nitrile products from this aqueous effluent.

The distillation of the aqueous effluent obtained directly from the ammonia neutralization column as a means to recover acrylonitrile, hydrocyanic acid, and acetonitrile results in the formation of tar in the distillation column and in the condenser. This tar formation which results from polymerization of acrylonitrile, hydrocyanic acid, etc. causes a breakdown in the continuous operation of the distillation column, rendering long-term stabilized operation impossible and also decreases the recovery ratio of acrylonitrile, hydrocyanic acid and acetonitrile.

As a result of assiduous research and investigation a process has been developed which eliminates the problems of contamination and tar formation, thereby enabling long-term continuous process operation and separation. This invention therefor specifically relates to an improvement in the process for separating and recovering of acrylonitrile, hydrocyanic acid and acetonitrile from an aqueous solution of these nitriles by distillation, wherein the aqueous solution of these nitriles is obtained by contacting the product mixture from the catalytic vapor phase reaction of propylene, ammonia and molecular oxygen with an acidic aqueous solution in an ammonia neutralization column, and whereby the distillation of the aqueous effluent from the ammonia neutralization column is carried out on an effluent to which has been added supplementary acetonitrile. A sufficient amount of acetonitrile is added so that the concentration of acetonitrile in the effluent prior to distillation is within the range of from 0.2 to 10 percent by weight. In addition to the aforementioned advantages associated with the process of this invention, it should be emphasized that the marked increase in the recovery ratios of acrylonitrile, hydrocyanic acid, etc., is due to a reduction in the polymerization of these nitriles.

The process described herein can be utilized in disposing of effluent waste from the separation and refining processes of acrylonitrile manufactured by the catalytic vapor phase reaction of propylene, ammonia and molecular oxygen, regardless of the means to cause the catalytic reaction or the nature of the catalyst employed therefor; but, in general, it is preferred that the process of this invention be utilized in disposing of the effluent waste from an acrylonitrile process in which a molybdenum-bismuth catalyst or a uranium-antimony catalyst is employed. More preferredly the process of this invention is utilized in conjunction with the disposal of effluent derived from an acrylonitrile manufacturing process in which the catalyst is a uranium-antimony catalyst.

While in accordance with this invention the quantity of acetonitrile to be added to the aqueous effluent from the ammonia neutralization column should be determined by the amount of acetonitrile already present in the effluent, it is suitable to add sufficient amounts of the nitrile so that the concentration of acetonitrile in the aqueous effluent to be introduced into the distillation column is in the range from about 0.2 to 10 percent by weight and preferably from about 0.3 to 4 percent by weight. The acetonitrile to be added may be obtained from other sources, but from the standpoint of technical efficiency it is advantageous to utilize the acetonitrile that is produced as a by-product in the manufacture of acrylonitrile and subsequently separated in the refining process. In particular, it is suitable to employ an aqueous concentrate of the by-product acetonitrile in which at least 5 percent by weight of acetonitrile is present. Equally suitable is the use of an aqueous concentrate in which acrylonitrile, hydrocyanic acid are in admixture with the acetonitrile.

In general, the nitrile compounds are recovered from the aqueous effluent of the ammonia neutralization column by continuous atmospheric distillation, however, the distillation may also be carried out at superatmospheric or at reduced pressures. Separation by batch-type distillation is also contemplated to be within the scope of this invention.

The acrylonitrile, hydrocyanic acid and acetonitrile recovered by distilling the effluent from the ammonia neutralizer are introduced into the product stream for separating and refining acrylonitrile and are then separated into the individual components. In accordance with this process, essentially all of the acetonitrile thus separated is then combined with the effluent from the ammonia neutralization column. The process of this invention is further illustrated by the schematic flow diagram shown in the accompanying Figure. Accordingly, air from line 1, ammonia and propylene from line 2 are introduced into reactor I which is filled with catalyst in a fluid form. Reaction takes place at a temperature of about 490° C. The gaseous reaction products formed are removed from reactor I through line 3 and are cooled to a temperature of about 250° C by means of a heat exchanger 4 and are then introduced to the ammonia neutralization column II where unreacted ammonia is neutralized with sulfuric acid solution entering from line 5. The gaseous products, consisting mainly of acrylonitrile, etc. are removed overhead from the ammonia neutralization column II via line 8 and are subsequently transmitted to a fractional refining process (not shown). The sulfuric acid solution employed for neutralizing the unreacted ammonia and containing ammonium sulfate, small quantities of acrylonitrile, hydrocyanic acid, acetonitrile, etc. is withdrawn from the bottom of the ammonia neutralization column II by means of line 6. A portion of the aqueous effluent from the ammonia neutralization column II is cooled by the heat exchanger 7 and is then mixed with additional sulfuric acid solution and recycled to the ammonia neutralization column II. Acetonitrile solution from line 11 (approximately 20 percent concentration) that is separated from the acrylonitrile fractional refining process is combined with the remainder of the effluent from the ammonia neutralization column II in line 6 and is transmitted by means of line 10 to the distillation column III. The acetonitrile solution is distilled in column III which is normally operated at atmospheric pressure and at a head temperature of 60°–65° C and a bottom temperature of 100° to 105° C. Acrylonitrile, hydrocyanic acid and acetonitrile are recovered overhead and are subsequently separated in the acrylonitrile refining process. The distilland from which acrylonitrile, hydrocyanic acid, etc. are removed, is withdrawn from the bottom of distillation column III by means of line 13. The separation of the nitriles may be further beneficiated by the use of polymerization inhibitors and deforming agents throughout the process.

The process of this invention is further illustrated by the following examples shown below, however the scope of this invention is not to be interpreted as being limited by the examples given.

EXAMPLES

In the presence of a catalyst composed of uranium and antimony deposited on a silica carrier a gaseous mixture of propylene, ammonia and air are reacted at a temperature of about 490° C in reactor I. The reactor effluent is passed through the heat exchanger 4 and is cooled to a temperature of 230° C and is then forwarded to the ammonia neutralization column II. The overhead removed from the ammonia neutralization column consists primarily of acrylonitrile, while the aqueous sulfuric acid extract removed from the bottom of the ammonia neutralization column has the following composition:

| | |
|---|---|
| Acrylonitrile | 1.0 wt% |
| Acetonitrile | 0.15 wt% |
| Hydrocyanic acid | 0.70 wt% |
| Ammonium sulfate | 15.00 wt% |

To the effluent removed from the bottom of the neutralization column is added a solution containing 20 percent by weight of acetonitrile so that the concentration of acetonitrile in the mixture charged to the distillation column exceeds 0.5 percent by weight. The distillation column, provided with 20 perforated trays, is operated at a temperature of 65° C at the column head and at 103° C at the bottom of the column. The composition of the overhead removed from the top of the distillation column is as follows:

| | |
|---|---|
| Acrylonitrile | 6 wt% |
| Acetonitrile | 20 wt% |
| Hydrocyanic acid | 6 wt% |
| Water | 68 wt% |

The ammonium sulfate solution removed from the bottom of the distillation column contains less than 10 ppm of acrylonitrile. On feeding 10 tons of solution per hour to the distillation column under the same conditions as above, the reboiler at the bottom of distillation column can be continuously operated for a period of 2 weeks, while the condenser at the top of the column is still in operating condition after a period of 6 months.

Normally the reboiler and condenser become fouled by the deposition of solid polymeric material from the polymerization of acrylonitrile or hydrocyanic acid on the surfaces of the equipment, so that heat exchange is virtually negligible. The reboiler cannot function adequately when about 40 kgs. of solid polymer are deposited on its surface, while the condenser becomes inoperable when the deposits on its surface reach about 80 kgs. The removal of these deposits from the surfaces of the equipment is both costly and time consuming.

Distillations carried out on an effluent without the additional acetonitrile results in the formation of polymeric deposits at the rate of about 20 kgs. per day so that fouling of the reboiler at the bottom of distillation column occurs in about 2 days and fouling of the condenser at the top of the distillation column occurs in about 20 days. A comparison of the results obtained on carrying out the distillation with and without the additional acetonitrile is shown in Table I.

TABLE I Effect of Distilling the Ammonia Neutralizer Effluent with and without Added Acetonitrile

| | No addition of Acetonitrile | Acetonitrile added |
|---|---|---|
| Reboiler: | | |
| Period of operability | approx. 2 days | approx. 2 wk. |
| Amount of solid deposit formed | 20 kg./day | 3 kg./day |
| Condenser: | | |
| Period of operability | approx. 20 days | more than 6 mo. |
| Amount of solid deposit formed | approx. 4 kg./day | less than 0.2 kg./day |

We claim:
1. In a process for recovering minor amounts of acrylonitrile, hydrocyanic acid and acetonitrile from an aqueous solution containing said nitriles, wherein the aqueous solution of said nitriles is obtained by contacting the product mixture resulting from a catalytic vapor phase ammoxidation process with an acidic aqueous solution to neutralize unreacted ammonia therein and wherein the major portion of the acrylonitrile product produced in the ammoxidation process has been removed from said aqueous solution, the improvement comprising adding a sufficient amount of acetonitrile to the aqueous solution of said nitriles so that the concentration of acetonitrile is within the range of 0.2 to 10 percent by weight based upon the weight of said solution, and subsequently distilling said solution to recover acrylonitrile, hydrocyanic acid and acetonitrile in the overhead therefrom.

* * * * *